US011808847B2

(12) United States Patent
Cohen et al.

(10) Patent No.: US 11,808,847 B2
(45) Date of Patent: *Nov. 7, 2023

(54) ROAD IDENTIFICATION SYSTEM USING ENHANCED CROSS-SECTION TARGETS

(71) Applicant: Fractal Antenna Systems, Inc., Bedford, MA (US)

(72) Inventors: Nathan Cohen, Belmont, MA (US); Philip Salkind, Boston, MA (US)

(73) Assignee: Fractal Antenna Systems, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,516

(22) Filed: Oct. 11, 2022

(65) Prior Publication Data

US 2023/0058690 A1   Feb. 23, 2023

Related U.S. Application Data

(63) Continuation of application No. 17/526,417, filed on Nov. 15, 2021, now Pat. No. 11,467,279, which is a
(Continued)

(51) Int. Cl.
*G01S 13/931* (2020.01)
*H01Q 15/00* (2006.01)
(Continued)

(52) U.S. Cl.
CPC .............. *G01S 13/931* (2013.01); *G01S 7/411* (2013.01); *H01Q 1/2225* (2013.01);
(Continued)

(58) Field of Classification Search
None
See application file for complete search history.

(56) References Cited

U.S. PATENT DOCUMENTS 5,308,186 A * 5/1994 Hedgewick ............. E01F 9/553
404/16
5,430,444 A    7/1995 Rix et al.
(Continued)

FOREIGN PATENT DOCUMENTS

WO   WO 2002/041448       5/2002
WO   WO 2012/154117 A1   11/2012

OTHER PUBLICATIONS

PCT International Search Report and Written Opinion dated Jan. 22, 2019 for International Application No. PCT/US2018/059987; 11 pages.

*Primary Examiner* — Marcus E Windrich
(74) *Attorney, Agent, or Firm* — DALY, CROWLEY, MOFFORD & DURKEE, LLP

(57) ABSTRACT

An aspect of the present disclosure is directed to and provides radar-reflecting systems and apparatus that employ metasurfaces to produce enhanced radar cross sections that are greater than those produced by the geometry of the surfaces alone. Another aspect of the present disclosure is directed to and provides heat-ducting systems and apparatus that include metasurfaces. A further aspect of the present disclosure is directed to and provides cards with metasurfaces. Exemplary embodiments utilize fractal plasmonic surfaces for a metasurface.

20 Claims, 5 Drawing Sheets

Related U.S. Application Data continuation of application No. 17/157,145, filed on Jan. 25, 2021, now Pat. No. 11,175,400, which is a continuation of application No. 16/185,445, filed on Nov. 9, 2018, now Pat. No. 10,901,082.

(60) Provisional application No. 62/618,165, filed on Jan. 17, 2018, provisional application No. 62/593,636, filed on Dec. 1, 2017, provisional application No. 62/583,740, filed on Nov. 9, 2017.

(51) Int. Cl.
    *G01S 7/41*     (2006.01)
    *H01Q 15/14*     (2006.01)
    *H01Q 1/36*     (2006.01)
    *H01Q 1/32*     (2006.01)
    *H01Q 1/22*     (2006.01)

(52) U.S. Cl.
CPC .......... *H01Q 1/3225* (2013.01); *H01Q 1/3233* (2013.01); *H01Q 1/3283* (2013.01); *H01Q 1/36* (2013.01); *H01Q 15/0086* (2013.01); *H01Q 15/14* (2013.01); *G01S 2013/9329* (2020.01)

(56) References Cited

U.S. PATENT DOCUMENTS

| | | | | |
|---|---|---|---|---|
| 5,501,545 | A * | 3/1996 | Walter | E01F 9/553 359/531 |
| 6,208,916 | B1 * | 3/2001 | Hori | G05D 1/0246 701/28 |
| 7,256,751 | B2 * | 8/2007 | Cohen | H01Q 1/36 343/792.5 |
| 7,301,493 | B1 | 11/2007 | Canales et al. | |
| 8,902,103 | B2 * | 12/2014 | Kim | G01S 13/345 342/134 |
| 9,482,474 | B2 | 11/2016 | Cohen | |
| 2002/0044080 | A1 * | 4/2002 | Shirai | G08G 1/167 342/72 |
| 2008/0252483 | A1 * | 10/2008 | Hodges | G08G 1/02 340/905 |
| 2014/0090828 | A1 * | 4/2014 | Cohen | F28F 7/00 165/185 |
| 2015/0247297 | A1 * | 9/2015 | Protzmann | E01C 11/00 428/407 |
| 2015/0260812 | A1 | 9/2015 | Drake et al. | |
| 2015/0303581 | A1 * | 10/2015 | Bodo | G01S 13/426 342/7 |
| 2017/0038160 | A1 | 2/2017 | Cohen | |

\* cited by examiner

ROAD IDENTIFICATION SYSTEM USING ENHANCED CROSS-SECTION TARGETS

CROSS-REFERENCE TO RELATED APPLICATIONS

The present application is a continuation of U.S. patent application Ser. No. 17/526,417, filed Nov. 15, 2021, and entitled "Road Identification System Using Enhanced Cross-Section Targets," which is a continuation of U.S. patent application Ser. No. 17/157,145, filed Jan. 25, 2021, and entitled "Road Identification System Using Enhanced Cross-Section Targets," which issued Nov. 16, 2021 as U.S. Pat. No. 11,175,400, which is a continuation of U.S. patent application Ser. No. 16/185,445, filed Nov. 9, 2018, and entitled "Road Identification System Using Enhanced Cross-Section Targets," which issued Jan. 26, 2021 as U.S. Pat. No. 10,901,082, which claims the benefit of and priority to the following provisional applications (i) U.S. Provisional Patent Application No. 62/583,740, filed Nov. 9, 2017, and entitled "Fractal Based Radar Targetting and Identification for Autonomus Vehicle Highwars"; (ii) U.S. Provisional Patent Application No. 62/593,636, filed Dec. 1, 2017, and entitled "Metasurface-Based Radar Targeting and Identification for Autonomous Vehicle Highways"; and, (iii) U.S. Provisional Patent Application No. 62/618,165, filed Jan. 17, 2018, and entitled "Fractal Metamaterial Applications"; each of which applications is hereby incorporated herein by reference in its entirety.

BACKGROUND

Automotive radar systems have been developed for to provide various benefits to drivers and pedestrians. For example, such radar systems may be used for adaptive cruise control, collision warning, automatic distance control, pre-crash detection, aiding in parking, cut-in collision warning, blind spot detection, and rear-end collision warning.

While such radar systems have been shown to be robust in use, the performance of the systems is typically limited, in use on vehicles and other locations, by the requirement of relatively large structures in order to produce large enough radar cross sections for the radar system to be able to detect those structures. The structures can act as "markers" and/or fiducial points by which the radar system "sees" and navigates the vehicle; during navigation, the radar system and vehicle are typically bounded or guided by the placement of the structures on the road, or other vehicles, or in raised structures on or adjacent to the road.

SUMMARY

An aspect of the present disclosure is directed to and provides radar-reflecting systems and apparatus that employ metasurfaces to produce radar cross sections greater than those produced by the geometry of the surfaces alone.

Another aspect of the present disclosure is directed to and provides heat-ducting systems and apparatus that include metasurfaces.

A further aspect of the present disclosure is directed to and provides cards with metasurfaces.

Exemplary embodiments utilize fractal plasmonic surfaces for a metasurface.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

An aspect of the present disclosure is directed to and provides devices and structures that incorporate plasmonic surfaces or structures embedded or included within the devices and structures and/or disposed on a surface or surfaces of the devices and structures. The plasmonic surfaces or structures can include metamaterials and can be referred to as "metasurfaces" or "metastructures." The metamaterials can include structures smaller than a wavelength of radiation of interest, e.g., used in a radar band. In exemplary embodiments, the plasmonic surfaces include fractal features, and can accordingly be referred to as "fractal plasmonic surfaces" or "FPS." Fractal plasmonic surfaces (FPS) are composed of or include fractal shapes which are closely spaced (close-spaced) and disposed upon or included a surface or structure. Without limiting the scope of the present disclosure, evanescent surface wave production through evanescent-wave transfer is believed to be the dominant mechanism by which information, power, and/or radiation are conveyed as radiative transfer on or in these surfaces and/or structures.

An exemplary aspect of the present disclosure is directed to and provides for the inclusion of plasmonic surfaces or structures with, inside, or on structures that are used for automobile use, including manned and unmanned (i.e., autonomous) vehicles. Road and automobile structures that such plasmonic surfaces or structures may be used with include, but are not limited to, road reflectors, stop signs, road barriers, toll booths and plazas, tracks or guides used with (e.g., embedded in) road surfaces, and components of road-going automobiles (including motorcycles) such as bumpers, frames, etc., as well as other structures that would normally be encountered in travel. Such plasmonic surfaces and/or structures can be used for systems for enhancing the performance of location-determination, safety, and/or collision-avoidance for vehicles, for non-limiting examples.

Figure 1:
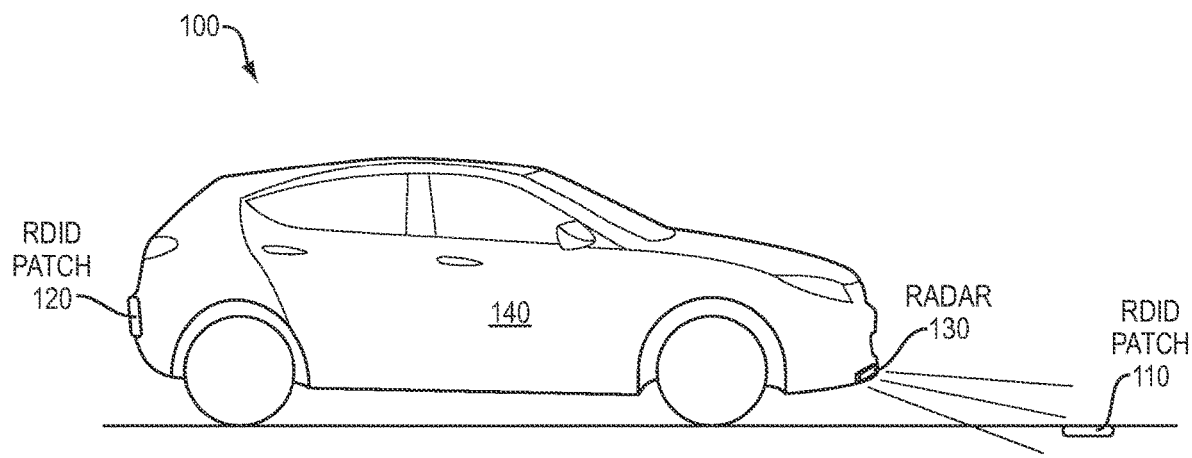
FIG. 1 shows a radar-reflective road identification ("RDID") system, in accordance with exemplary embodiments of the present disclosure.

Exemplary embodiments of the present disclosure have application to manned and/or autonomous vehicles on highways, by employing metasurface-based reflectors for reflecting radar signals/radiation, e.g., from a vehicle's on-board radar. FIG. 1 depicts a system 100 employing radar-reflective materials, in accordance with an illustrative embodiment. System 100 includes conductive or otherwise highly radar-reflective material configured as "patches" 110 and 120. These patches 110 and 120 incorporate a metamaterial surface (metasurface) having or producing a radar cross section which is higher than one of a conductive continuous sheet of the same size. The patches 110 and 120 can be used in conjunction with a radar system 130, e.g., an operational transceiver, onboard an automobile 140. In exemplary embodiments, the metasurface may be or include an FPS. Thus, embodiments of the present disclosure can provide means for scattering the incident radar waves/energy/radiation through use a type of structure, e.g., a metasurface or metastructure, having a radar cross section far larger than that due solely to its physical size in the absence of the metasurface.

The metasurface used for the patches 110, 120 can act as an identification system, or a super-scatterer, having a larger radar cross-section than the radar cross-section of the unit without the metasurface. In exemplary embodiments, plastic road reflectors, which are built as plastic pieces that reflect light, can also incorporate one or more metasurface or FPS features in accordance with the present disclosure. Exemplary embodiments of a plasmonic-surface based road feature are described in further detail below.

Figure 2:
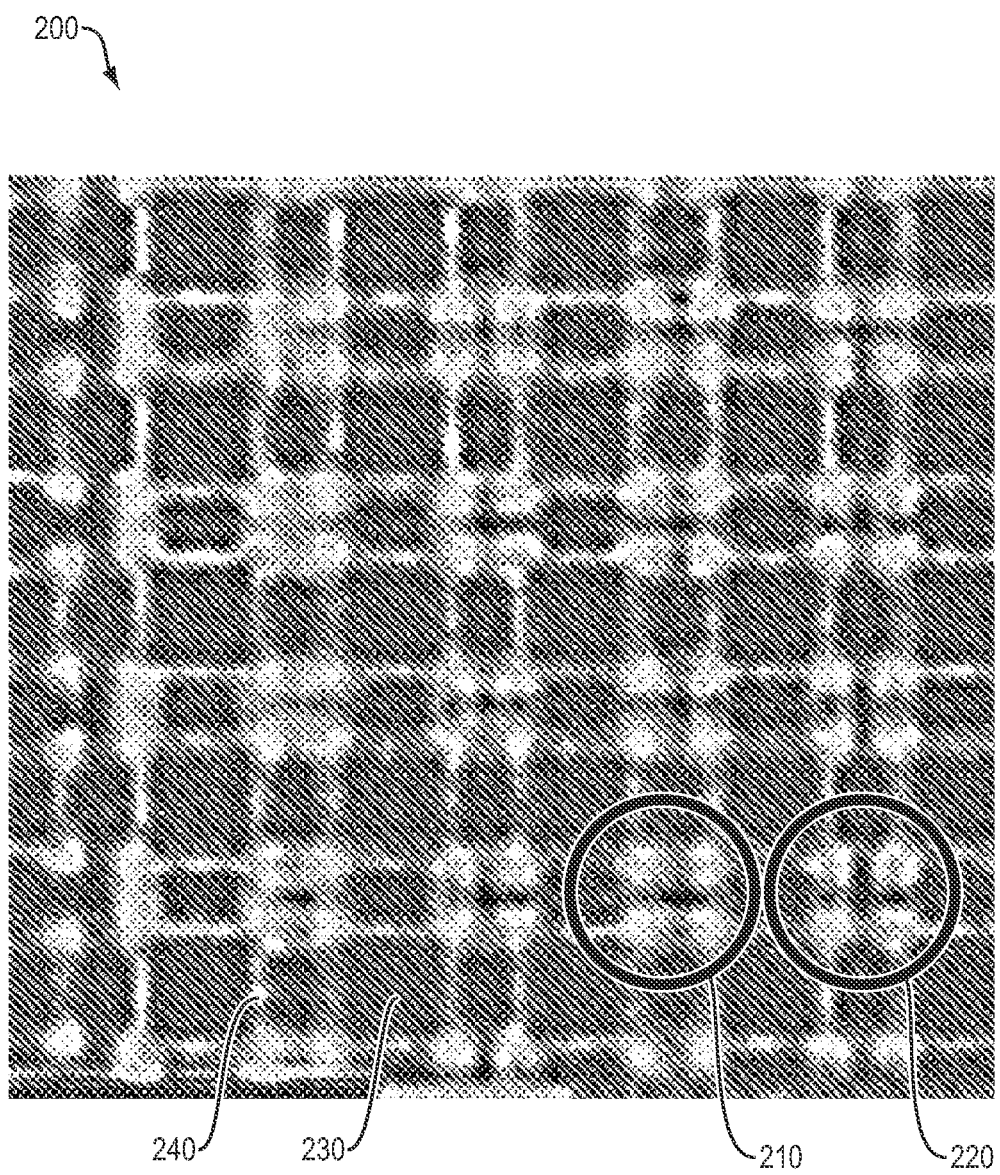
FIG. 2 shows features of a RDID patch, in accordance with exemplary embodiments of the present disclosure.

FIG. 2 depicts an example of conductive metasurface 200 for use in a radar road reflector, according to exemplary embodiments of the present disclosure. FIG. 2 shows rectangles of conductor surrounded by smaller rectangles, e.g., 210 and 220, which are connected by a thin lattice 240 and repeated across the area. The dark regions, e.g., 230, are a dielectric substrate. Any suitable material(s) can be used for the conductors, e.g., conductive paint, copper traces, etc. Any suitable material(s) can be used for the substrate, e.g., FR4, polyimide, etc. While FIG. 2 depicts an exemplary embodiment of a metasurface 200, metasurfaces in accordance with the present disclosure can include other shapes or unit cells. Examples include, but are not limited to, split-ring resonators, nested triangles, transmission line equivalents, posts, honeycomb structures with wells, etc. In exemplary embodiments, metamaterial(s) used can produce a negative index of refraction for radiation at the operational wavelength(s), e.g., SRR or LRR band.

In exemplary embodiments, resonators or cells included on the metasurface (e.g., patches 110 and 120 of FIG. 1) are separated from others. Resonators or cells, e.g., conductive shapes, may be isolated from the other(s) meaning that no conductive material is present which connects them, e.g., they are in galvanic isolation from one another. Examples of such physically-isolated cells or resonators are shown in FIG. 3.

Figure 3:
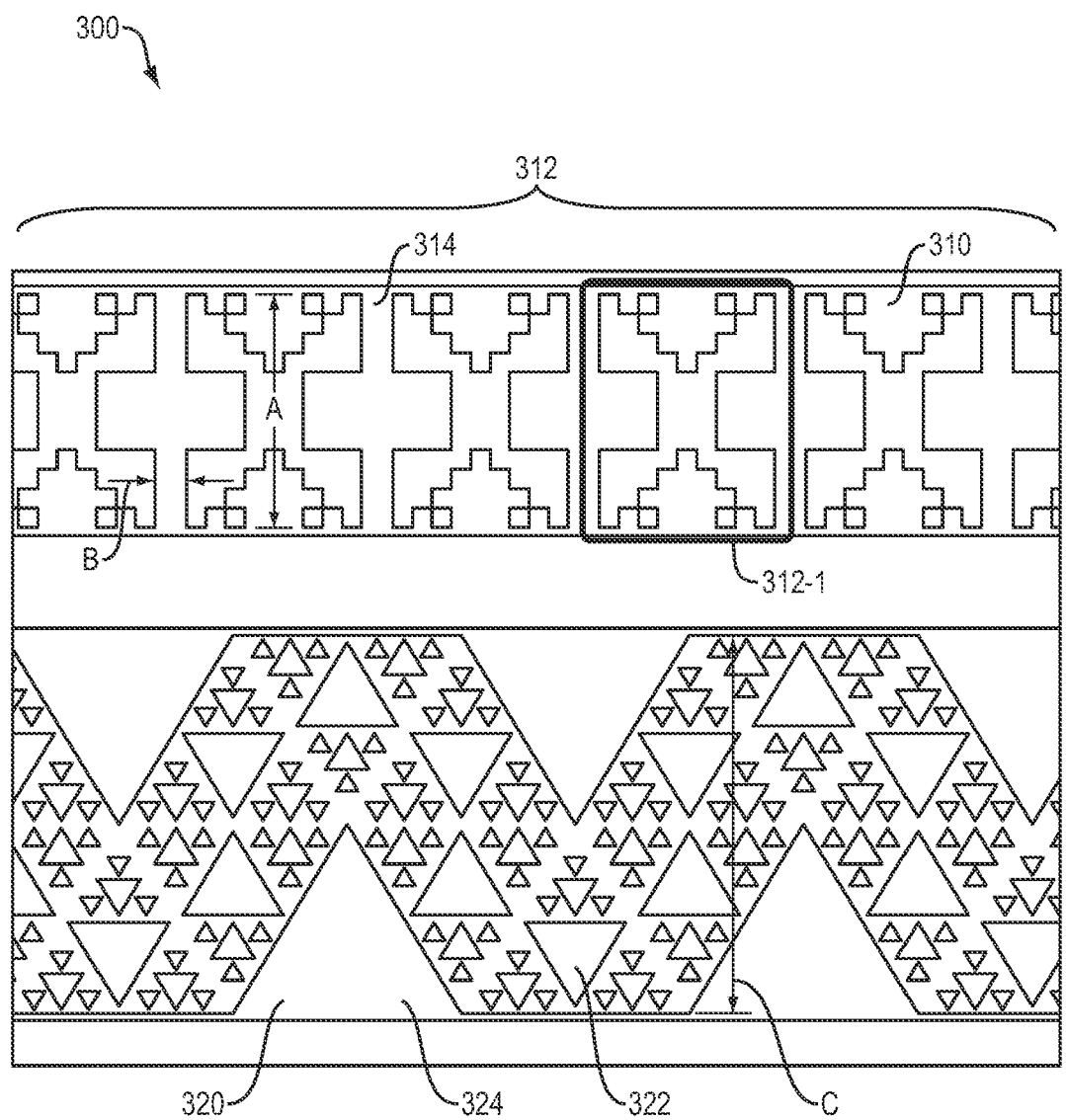
FIG. 3 depicts a set of examples of fractal plasmonic surfaces (FPS) that can be used or integrated with radar reflectors, in accordance with the present disclosure.

FIG. 3 depicts a set 300 of examples of fractal plasmonic surfaces (FPS) that can be used or integrated with radar road reflectors, in accordance with the present disclosure. Two different FPS configurations are shown: a four-lobed design 310, and a saw-tooth design including a Sierpinski triangular mesh 320. Design 310 includes an array 312 of individual four-lobed resonators or cells, e.g., 312-1, that are disposed on a substrate 310. The cells (which may also be referred to as "unit cells" or "resonators") are physically separate from one another. They are not in direct connection by any conductive material or path. This arrangement can be considered as galvanic isolation.

As shown the cells have a characteristic dimension "A," e.g., a height or major-axis, which can be designed or selected based on a particular operational wavelength or range of wavelengths used for a radar system used with the FPS. Further as shown, the individual cells or resonators can be separated from adjacent cells or resonators by a separation distance B, which can also be designed or selected based on an operational wavelength or wavelengths.

With continued reference to FIG. 3, design 320 employs a triangle generator motif, e.g., 322, as cutouts or voids within conductive material (lighter shading) on a substrate 324. As shown, design 320 can have a characteristic dimension C, e.g., a width or height.

Thus, as described for FIGS. 1-3, radar-reflecting structures according to the present disclosure can be shaped or configured as metamaterial surfaces having arrangements or arrays of closely packed resonators (or cells) that function as radar scatterers. These radar scatters can be made into desired or appropriates sizes, which produce a radar cross section far higher than due to their physical size alone. Thus, such metasurfaces or structure(s) containing such a metasurface or metasurfaces can constitute ideal road markers or "identification markers," also referred to herein as "patches," "radar road reflectors," or "RDID patches," where RDID refers to "road ID". Such RDID patches may be used advantageously, for example, in collision avoidance systems, marking, and location identification on highways and on vehicles. These RDID patches may be small enough to easily place on or into a road surface, another vehicle's body or bumper, obstacles on or near the road, traffic cones or jersey style barriers or fences, trees, and so on. In exemplary embodiments, cells of these RDID patches may be fractal in shape and may be referred to as fractal RDID patches. RDID patches may be embedded within or covered by protective materials such as hard plastics or composites that do not impede or prevent the operation of the RDID patch (metasurface) with incident radiation. For example, a RDID patch may be encased in a hard plastic or resin, such as a high impact traffic-bearing plastic, that is sufficiently strong and durable for use on or in a road lane reflector or guidance reflector that is expected to be subject to the weight, pressure, and impact of vehicles passing over it. A RDID patch may be encased, embedded, or otherwise embodied in a traffic-bearing reflector that includes a visible-light reflector. Embodiments of a RDID patch can include more than one metasurface, e.g., FPS, for operation at multiple wavelengths of incident radiation. Such multiple metasurfaces may be stacked in layers, e.g., each having their own substrate, or may be disposed or formed on the same substrate.

In an additional aspect of the invention, a RDID patch or patches may employ a metasurface having combinations of shapes that make up the metasurface, with at least some difference in shape between the conductive elements of the patch or patches. This arrangement can produce a frequency-dependent radar cross section by which a broad-banded radar is able to see different maximum cross sections at different frequencies. The arrangement of frequencies of such may be used effectively as an encoding mechanism, e.g., by which the RDID patch encodes information, such as location, presence of one or more obstacles (e.g., "obstacles ahead" or "falling rock"), and the like. The reflections can be more intense at some frequencies than others, based on the shapes. The arrangement, in frequencies, of these "reflection bands" can act as an encoding.

Embodiments of the present disclosure can be designed for and implemented for operation with or over a general frequency range, such as well-known microwave RF bands, but the scope of the present disclosure is not limited to those defined frequency ranges; and, in other embodiments other different or overlapping electromagnetic frequency bands (including those in the optical ranges of UV, visible, and IR) can be realized.

A further aspect of the present disclosure is directed to and provides methods of producing, acquiring, processing, and/or displaying the information procured by use of a fractal RDID patch or patches, incorporating (vehicle) on-board computers, transmitters, receivers, antennas, displays, as well as vehicles so equipped; accordingly, embodiments of the present disclosure can facilitate autonomous vehicle (guidance) systems.

In exemplary embodiments, systems according to the present disclosure use conductive or otherwise highly radar reflective "patches" having metasurfaces incorporating at least one shape which is at least, in part, described as a substantially self-similar shape, or fractal, having at least two iterations of application of a motif (generator motif). Such radar reflecting structures—with resonators that are shaped as fractals—may be referred to as "fractal RDID patches." Fractal RDID patches can be small enough to easily place on or into a road surface, a vehicle's body or bumper, obstacles on or near a road, traffic cones or jersey style barriers or fences, trees, and the like. These fractal RDID patches may also be made into a close spaced array such as a fractal metamaterial.

Exemplary embodiments of FPS and/or metasurface-based RDID structures are designed for use at certain frequencies used in automotive radar applications. For example, a RDID structure (e.g., lane marker) according to the present disclosure may be configured for operation at 24 GHz, e.g., as coinciding with so-called short-range radar ("SRR"). At 24 GHz, the operational wavelength is approximately 12.5 mm (or, 0.5 inches), which can be used then to design the size and separation distance used for the FPS or metasurface features. As another example, a RDID structure (e.g., lane marker) according to the present disclosure may be configured for operation at 77 GHz or within the range of 76-81 GHz, e.g., as coinciding with SRR, so-called medium-range radar ("MRR"), and/or so-called long-range radar ("LRR"). At 77 GHz, the operational wavelength is approximately 4 mm (or 0.157 inches), which can be used then to design the size and separation distance used for the FPS or metasurface features.

A characteristic dimension of each resonator or cell used for an FPS or metasurface-based (metasurface) structure can be derived from or based on an operational wavelength of incident radiation, e.g., such as that from an automotive radar system (e.g., within the range of wavelengths from about 3 mm to about 13 mm). For example, assuming an operational wavelength of 4 mm (similar to that of a SRR system), a characteristic dimension of a cell within the FPS or metasurface or structure could be 0.5 mm (i.e., ⅛ of a wavelength, or lambda). Using an operational wavelength of 12.5 mm, a characteristic dimension of a cell within the FPS or metasurface or structure could be 3.125 mm (i.e., ⅛ of a wavelength, or lambda). Of course, other values can be used for a characteristic dimension (e.g., major or minor axis, diameter, height, etc.) of a cell or resonator vis-à-vis an operational wavelength. For example, a cell or resonator may have a characteristic dimension (e.g., major or minor axis, diameter, height, etc.) on the order of the operational wavelength (or for a range of wavelengths, a wavelength within or at a bound of the range). For further example, a cell or resonator may have a characteristic dimension of about ½, ⅓, ¼, ⅕, ⅙, ⅐, ⅑, ⅒, etc. of the operational wavelength (or for a range of wavelengths, a wavelength within or at a bound of the range). For further example, other values may be used for a characteristic dimension of a cell or resonator of an FPS or metasurface. Metasurfaces can accordingly be designed for operation with particular wavelengths or frequency bands of incident radiation, e.g., LRR, MRR, and/or SRR automotive radar bands.

Cells or resonators of an FPS or metasurface-based structure (e.g., a RDID) are preferably separated by a separation distance that is a fraction of an operational wavelength or nominal wavelength of an automotive radar system. Examples of such a separation distance can include, but are not limited to, ¾, ⅔, ½, ⅓, ¼, ⅕, ⅙, ⅐, ⅛, ⅑, ⅒, 1/11, 1/12, 1/20, etc. of the operational wavelength (or for a range of wavelengths, a wavelength within or at a bound of the range). For further example, other values may be used for the separation distance or separation distances of an FPS or metasurface; a distribution of resonators or cells within an FPS or metasurface need not be uniform and can have a non-uniform spatial distribution. Metasurfaces can accordingly be designed for operation with particular wavelengths or frequency bands of incident radiation, e.g., LRR, MRR, and/or SRR automotive radar bands.

Figure 4:
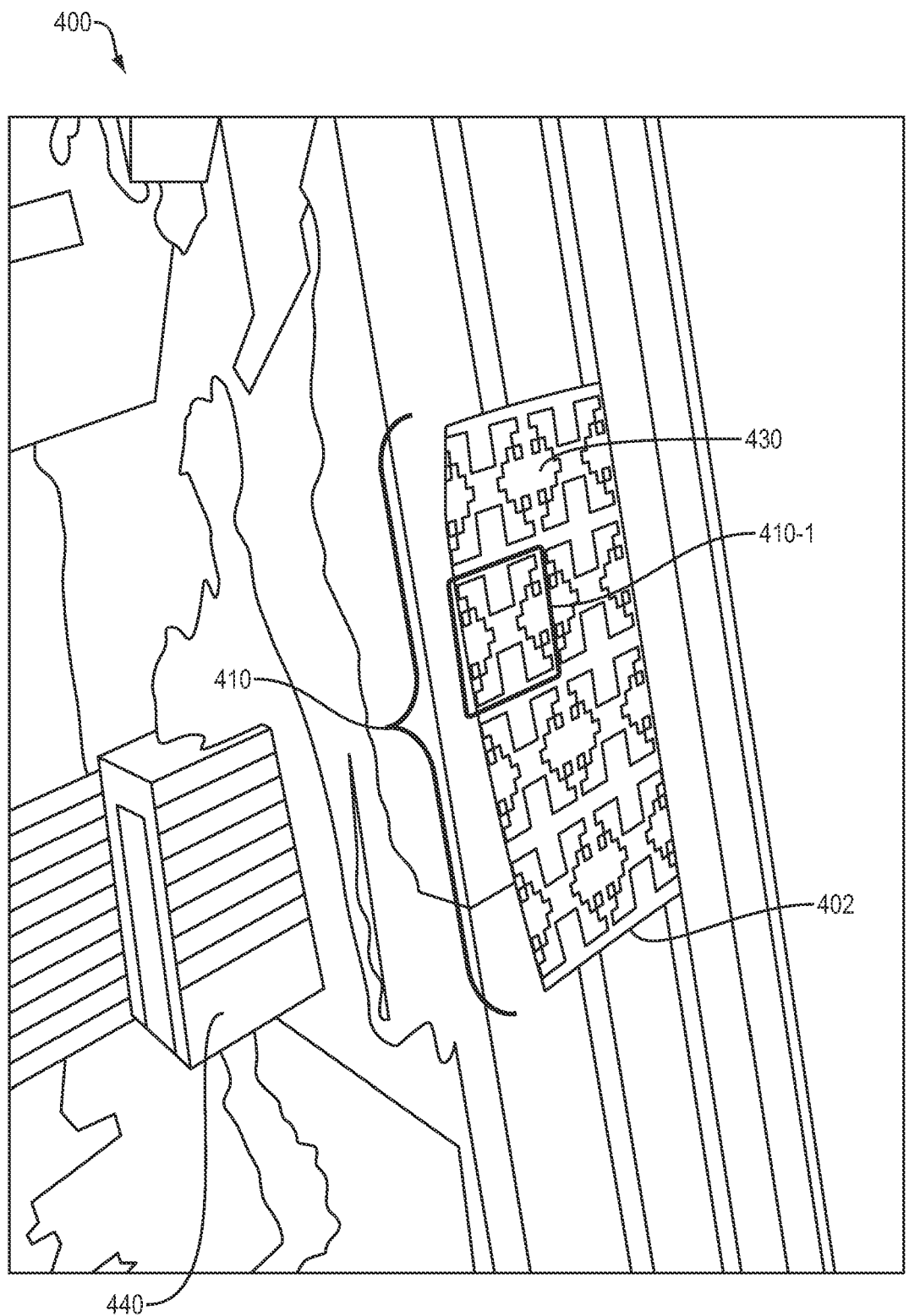
FIG. 4 shows a fractal plasmonic surface configured as a heat-ducting system, in accordance with further embodiments of the present disclosure.

Further embodiments of the present disclosure are directed to and can provide metasurfaces that are useful outside of radar reflection. For example, metasurface-based heat-direction systems can utilize a layer or layers of FPS or metasurface on a substrate to direct infrared energy in desired directions. FIG. 4 shows an example of such a system 400 utilized for a window. System 400 includes a metamaterial surface (metasurface) 402 including a plurality of resonators (or, cells) 410 disposed on a substrate 430. The cells of the metasurface may be configured in exemplary embodiments to transfer radiation at infrared ("IR") wavelengths, e.g., any of near-IR, medium-IR, and far-IR wavelengths). The metamaterial surface 402 may be disposed on a windowpane 440 of a window, as shown. In exemplary embodiments, the substrate may be made of a transparent or translucent material.

While metasurface 402 is shown as having resonators, e.g., 410-1, of a given size, the indicated size is primarily for the purpose of illustration. In exemplary embodiments, the resonators of an IR-direction systems (which may also be referred to as "IR-ducting" or "heat-ducting" systems) such as system 400 are designed and fabricated to have characteristic dimensions and/or separation distances selected for use at infrared wavelengths, as described previously.

The metasurface, or metastructure (e.g., FPS) 402 within or on the windowpane 440 can transfer the infrared energy off to the side(s) of the window edge thereby preventing most of the infrared energy from passing through the window into the, e.g., interior environment of a related structure or building. In addition, the infrared radiation, being transferred to the side or edges of the window, may be collected and used, e.g., for energy harvesting and/or heating. While system 400 is shown with metamaterial surface 402 on one side of the window-pane 440, the metasurface 402 could, instead or in addition to, be disposed on the opposite surface of the windowpane, e.g., for facilitating the prevention of infrared energy from leaving an interior space of a building or structure having the windowpane 440. Accordingly, embodiments of the present disclosure can be used for heating and/or cooling of structures or areas. Exemplary embodiments of such a system can be designed for use with incident radiation of wavelengths between, e.g., 700 nm to 1 mm; other wavelengths may be used or designed for in alternate embodiments.

Figure 5:
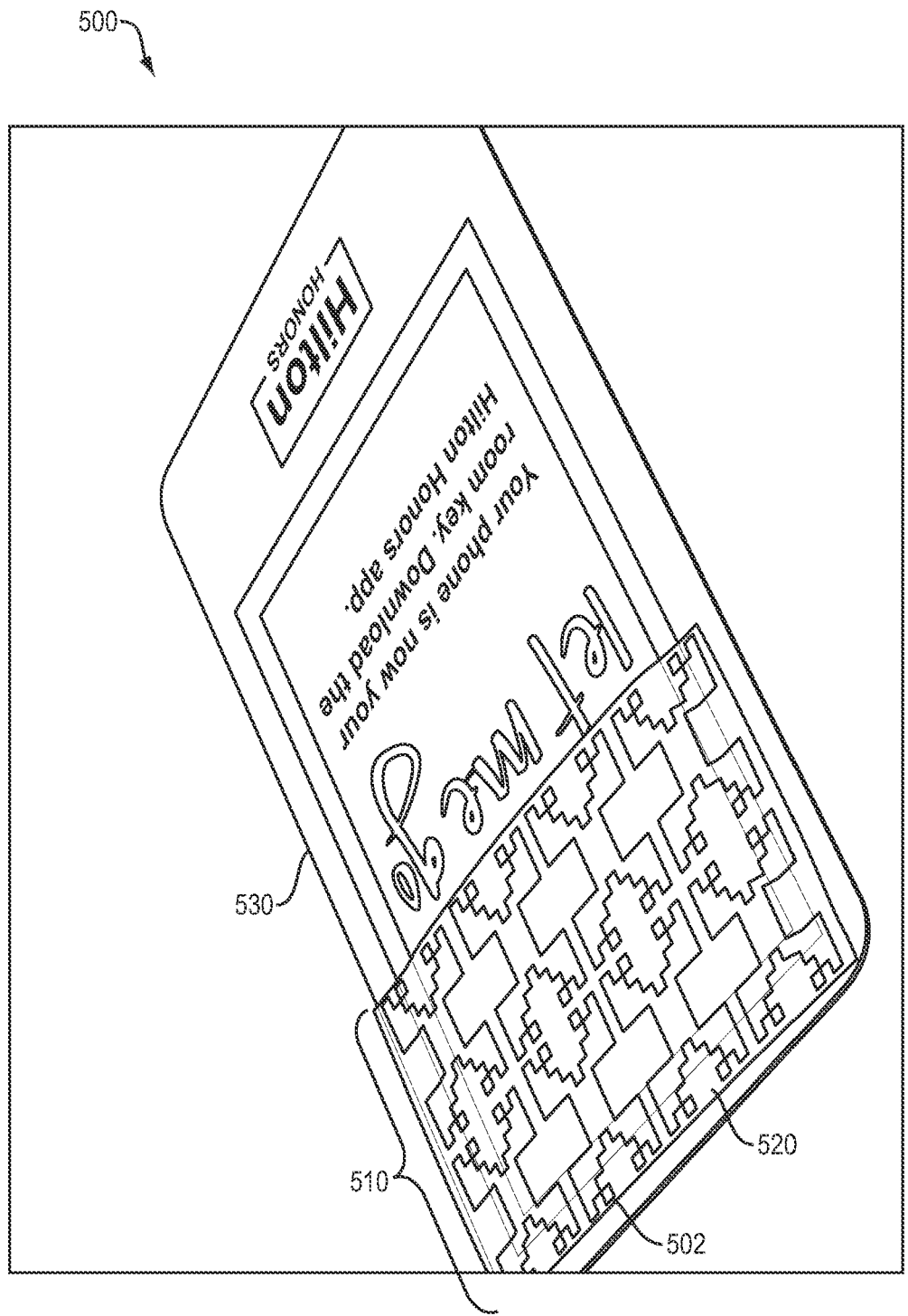
FIG. 5 shows a card including a fractal plasmonic surface, in accordance with other embodiments of the present disclosure.

Further embodiments of the present disclosure include metasurfaces that can be used for identification and/or as keys or cards. FIG. 5 shows one example of a card or card system 500 with plasmonic metasurface 502, in accordance with the present disclosure. The metasurface 502 includes a plurality of resonators 510 disposed on a substrate 520. The substrate 520 can be applied to a card, e.g., a pre-existing credit card or room key card 530. The card 500 may be made of plastic or other suitable material. As shown, in exemplary embodiments the plurality of resonators can be configured as an FPS having separated resonators. Such a device 500 can act as an identification system through wireless transmission and may for example be a vetting mechanism for positive identification A card having a metasurface may also be used for example to access door locks hotel rooms and so on. Such a card may be used for or with near-field communication systems. Accordingly, a card having a metasurface, metastructure, and/or FPS, may be used to activate switches, provide identifying information, and so on. In exemplary embodiments, the substrate may be made of a transparent or translucent material. Exemplary embodiments of a metasurface card (e.g., similar to that of system 500) can be designed for operation at 13.56 MHz, e.g., according to the ISO/IEC 18000-3 standard (including MODE 2). Exemplary embodiments may be used for RFID.

Exemplary Embodiments

Clause 1: A radar road reflector comprising:
a metasurface having a plurality of resonators, wherein the metasurface includes a substrate supporting the plurality of resonators, wherein the metasurface has an area, wherein the plurality of resonators support plasmonic transfer of incident radiation across the surface, and wherein the metasurface provides a radar cross section that is larger than a radar cross section of the area of substrate itself without the plurality of resonators.

Clause 2: The radar road reflector of clause 1, further comprising a support that supports the metasurface.

Clause 3: The radar road reflector of clause 2, wherein the support is configured for application to a road surface.

Clause 4: The radar road reflector of clause 3, wherein the support is made of high-impact plastic.

Clause 5: The radar road reflector of clause 1, wherein the metasurface comprises a fractal plasmonic surface (FPS).

Clause 6: The radar road reflector of clause 5, wherein the FPS comprises a plurality of resonators having fractal shapes separated from one another.

Clause 7: The radar road reflector of clause 6, wherein resonators of the FPS are separated by a separation distance of about 1/10 to about 1/2 of a radar wavelength of operation.

Clause 8: The radar road reflector of clause 7, wherein the radar wavelength of operation corresponds to a SRR band at 24 GHz.

Clause 9: The radar road reflector of clause 7, wherein the radar wavelength of operation corresponds to a LRR band at 77 GHz.

Clause 10: The radar road reflector of clause 7, wherein the separation distance is less than about 1/8 of the radar wavelength of operation.

Clause 11: The radar road reflector of clause 1, wherein resonators of the metasurface have a characteristic dimension of about 1/8 of a radar wavelength of operation.

Clause 12: The radar road reflector of clause 11, wherein the radar wavelength of operation corresponds to a SRR band at 24 GHz.

Clause 13: The radar road reflector of clause 11, wherein the radar wavelength of operation corresponds to a LRR band at 77 GHz.

Clause 14: The radar road reflector of clause 4, wherein the support comprises a visible-light reflector.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

What is claimed is:

1. A radar road reflector comprising:
a metasurface having a plurality of resonators, wherein the metasurface includes a conformal substrate that is conformable to a curvilinear surface and supporting the plurality of resonators, wherein the metasurface has an area, wherein the plurality of resonators support plasmonic transfer of incident radiation across the surface, and wherein the metasurface provides a radar cross section that is larger than a radar cross section of the area of substrate itself without the plurality of resonators;
wherein the conformable substrate is disposed on a vehicle.

2. The radar road reflector of claim 1, further comprising a support that supports the metasurface.

3. The radar road reflector of claim 1, wherein the metasurface comprises a fractal plasmonic surface (FPS).

4. The radar road reflector of claim 3, wherein the FPS comprises a plurality of resonators having fractal shapes separated from one another.

5. The radar road reflector of claim 4, wherein resonators of the FPS are separated by a separation distance of $1/10$ to $1/2$ of a radar wavelength of operation.

6. The radar road reflector of claim 5, wherein the radar wavelength of operation corresponds to a SRR band at 24 GHz.

7. The radar road reflector of claim 5, wherein the radar wavelength of operation corresponds to a LRR band at 77 GHz.

8. The radar road reflector of claim 5, wherein the separation distance is less than $1/8$ of the radar wavelength of operation.

9. The radar road reflector of claim 1, wherein resonators of the metasurface have a characteristic dimension of $1/8$ of a radar wavelength of operation.

10. The radar road reflector of claim 9, wherein the radar wavelength of operation corresponds to a SRR band at 24 GHz.

11. The radar road reflector of claim 1, wherein the radar wavelength of operation is within a range of about 76 GHz to about 81 GHz.

12. The radar road reflector of claim 1, wherein the vehicle comprises a motorcycle.

13. A radar road reflector comprising:
a metasurface having a plurality of resonators, wherein the metasurface includes a conformal substrate that is conformable to a curvilinear surface and supporting the plurality of resonators, wherein the metasurface has an area, wherein the plurality of resonators support plasmonic transfer of incident radiation across the surface, and wherein the metasurface provides a radar cross section that is larger than a radar cross section of the area of substrate itself without the plurality of resonators;
wherein the conformable substrate is disposed on a surface of a stationary object.

14. The radar road reflector of claim 13, further comprising a support for the metasurface.

15. The radar road reflector of claim 14, wherein the support is configured for application to a sign.

16. The radar road reflector of claim 13, wherein the stationary object comprises a building.

17. The radar road reflector of claim 13, wherein the stationary object comprises one or more tracks of guides disposed in or on a road surface.

18. The radar road reflector of claim 13, wherein the substrate is configured for application to a window.

19. The radar road reflector of claim 18, wherein the substrate comprises a transparent material.

20. The radar road reflector of claim 13, wherein the metasurface is configured for operation at a wavelength within an automotive radar band.

* * * * *